United States Patent Office 3,484,434
Patented Dec. 16, 1969

3,484,434
SEPARATION OF LACTAMS AND CYCLO-ALKANONE OXIMES
John R. Norell, Bartlesville, Okla., assignor to Phillips Petroleum Company, a corporation of Delaware
No Drawing. Filed Oct. 14, 1966, Ser. No. 586,616
Int. Cl. C07d 41/06; C02d 29/22
U.S. Cl. 260—239.3
8 Claims

ABSTRACT OF THE DISCLOSURE

Lactams are produced from oximes by Beckmann rearrangement in which unreacted oxime is extracted from the reaction mixture prior to extraction of the lactam.

---

This invention relates to lactams. In one aspect it relates to a process for the separation of a lactam and an unreacted cycloalkanone oxime from mixtures obtained in processes wherein a cycloalkanone oxime is partially converted to a lactam.

It is well known that lactams can be produced by the Beckmann rearrangement of cycloalkanone oximes by treatment of the oxime with substances such as sulfuric acid, oleum, chlorosulfonic acid, hydrogen fluoride, polyphosphoric acid, phosphorous pentachloride, and the like. Often it is advantageous to carry out the rearrangement reaction under conditions such that only a portion of the oxime is converted to the lactam in order to minimize side reactions which lower the yield of the desired lactam as well as introduce impurities into the lactam. Such impurities are deleterious in the subsequent polymerization of the lactam to a polyamide, and the removal of these impurities requires the use of costly purification steps. These undesirable features are in large measure circumvented by carrying out the conversion of the oxime to only a limited extent. However, a suitable process is required to separate the unreacted oxime and the produced lactam from each other and from other components in the mixture containing the oxime and lactam.

An object of my invention is to provide a high purity lactam.

Another object of my invention is to provide a method for separating a lactam and a cycloalkanone oxime from a mixture containing the same.

Other aspects, objects and advantages of the invention will be apparent to one skilled in the art from a study of the disclosure and the appended claims.

According to the present invention a reaction mixture resulting from the incomplete conversion of a cycloalkanone oxime to a lactam by the Beckmann rearrangement reaction is diluted with water and neutralized with a base. The neutralized reaction mixture is selectively extracted with a dialkyl ether having about 4 to 6 carbon atoms thereby forming an ether phase and an aqueous phase. The dialkyl ether extracts substantially all of the unreacted cycloalkanone oxime whereas substantially all of the produced lactam remains in the aqueous phase. Thus, the removed, unreacted cycloalkanone oxime can be recycled for subsequent conversion to a lactam.

The aqueous phase containing substantially all of the produced lactam is then selectively extracted with a chlorinated aliphatic hydrocarbon selected from the group consisting of polychloroalkanes having 1–4 carbon atoms and polychloroalkenes having 2–4 carbon atoms to remove the lactam from the aqueous phase. The solvent is then distilled from the chlorinated aliphatic hydrocarbon solution to give as a residue a high purity lactam. The high purity lactam can be used directly in other processes, e.g., as a monomer in the production of a polyamide.

The process of this invention can be employed in the production of lactams from cyclopentanone oxime, cyclohexanone oxime, cycloheptanone oxime, and cyclooctanone oxime that is, cycloalkanone oximes having 5 to 8 carbon atoms. It is especially well adapted to the production of caprolactam from cyclohexanone oxime.

Any of the dialkyl ethers having 4 to 6 carbon atoms, e.g., diethyl ether, dipropyl ether, diisopropyl ether, methyl propyl ether, methyl isopropyl ether, methyl butyl ether, methyl isobutyl ether, methyl pentyl ether, ethyl propyl ether, ethyl isopropyl ether, ethyl butyl ether, ethyl sec-butyl ether, and the like, can be employed in the extraction of the oxime. Diethyl ether is the preferred ether. Mixtures can also be employed if desired.

Polychloroalkanes having 1–4 carbon atoms which can be employed in the extraction of the produced lactam from the aqueous phase can be selected from the group consisting of chloroform, methylene chloride, carbon tetrachloride, 1,2-dichloroethane, 1,2-dichloropropane, 1,3-dichloropropane, 1,4-dichlorobutane, and 1,1,1-trichloroethane. Polychloroalkenes having 2–4 carbon atoms which can be employed in the extraction of the produced lactam from the aqueous phase can be selected from the group consisting of trichloroethylene, tetrachloroethylene, 1,1-dichloroethylene, 1,2-dichloropropene, 1,2,3-trichloropropene, 1,3-dichloro-1-butene, and 1,4-dichloro-2-butene. Although any of the chlorinated aliphatic hydrocarbons listed above can be used to extract the lactam, chloroform is the preferred extraction solvent.

In carrying out the process of this invention, the reaction mixture resulting from the partial conversion of the cycloalkanone oxime to the lactam by the Beckmann rearrangement is first treated with water and a base. The amount of water employed will usually be within the range of 1 to 10 volumes, preferably 2 to 8 volumes, per volume of reaction mixture. Sufficient base, in other words, ammonia, ammonium hydroxide, sodium hydroxide, potassium hydroxide, sodium carbonate, sodium bicarbonate, or the like is added to make the mixture neutral or slightly alkaline. The aqueous neutral, or slightly basic, solution is then extracted with the dialkyl ether in a batch or continuous process, the amount of the dialkyl ether used being at least an amount sufficient to extract substantially all of the cycloalkanone oxime. The amount of the dialkyl ether used can vary over a wide range but generally will be within the range of about 3 to 100 parts by weight of the ether per part by weight of the cycloalkanone oxime, usually being within the range of about 10 to 40 parts by weight of ether per part by weight of the oxime. If desired, mixtures of two or more of the dialkyl ethers can be employed. After extraction of the cycloalkanone oxime with the dialkyl ether and separation of the ether phase from the aqueous phase, the resulting aqueous mixture is extracted with one or more of the chlorinated aliphatic hydrocarbons specified above in an amount at least sufficient to extract substantially all of the lactam from the mixture. The amount of the chlorinated aliphatic hydrocarbon can vary over a broad range but generally will be within the range of about 3–400 parts by weight of the chlorinated aliphatic hydrocarbon per part by weight of the lactam, usually being within the range of about 10–150 parts by weight of chlorinated aliphatic hydrocarbon per part by weight of the lactam. Larger amounts of the chlorinated aliphatic hydrocarbon, in other words, amounts up to about 400 parts, or more, by weight of the chlorinated aliphatic hydrocarbon per part by weight of lactam, can be employed. If desired, mixtures of two or more of the chlorinated aliphatic hydrocarbons can be used.

The temperature and pressure at which each of the extractions is conducted are not critical provided the extracting solution and the aqueous mixture being extracted are maintained substantially as liquid phases. For convenience the extractions are normally carried out at approximately room temperature and approximately atmospheric pressure.

Following extraction, the unreacted cycloalkanone oxime is readily recovered from the dialkyl ether by distillation of the solvent, with prior drying if desired. The recovered oxime can be recycled to the reactor, where the oxime is again subjected to conditions permitting rearrangement to the lactam. The produced lactam is readily recovered from the chlorinated aliphatic hydrocarbon by distillation of the solvent, with prior drying if desired.

EXAMPLE I

Cyclohexanone oxime (22.6 g., 0.20 mol) was dissolved in a mixture of 75 ml. of acetic acid and 75 ml. of anhydrous, liquid hydrogen fluoride in a polyethylene reaction vessel. The mixture was stirred at room temperature for 6 hours, after which it was allowed to stand overnight, resulting in the rearrangement of a portion of the cyclohexanone oxime to caprolactam. The reaction mixture was then poured into 500 ml. of an ice-water mixture, and approximately 350 ml. of concentrated ammonium hydroxide was added to neutralize the resulting mixture. The mixture was then extracted with three 200 ml. portions of diethyl ether, and the combined ether extracts were dried over magnesium sulfate. Removal of the ether gave a residue, 20.3 g., of a light brown solid. Gas chromatographic analysis of a chloroform solution of this solid indicated that no caprolactam was present, and that the solid was essentially pure cyclohexanone oxime, thus representing a recovery of 90 percent of the cyclohexanone oxime employed. The aqueous solution remaining from the ether extraction was then extracted with three 200 ml. portions of chloroform. The combined chloroform extracts were dried over magnesium sulfate, and solvent was removed by distillation, giving a residue, 2.6 g. of a liquid which was shown by gas chromatographic analysis to contain only caprolactam, a small amount of residual chloroform, and a trace of cyclohexanone oxime.

EXAMPLE II

Cyclohexanone oxime (22.6 g., 0.20 mol) was dissolved in a mixture of 75 ml. of acetic acid and 75 ml. of anhydrous, liquid hydrogen fluoride. Initially, the reaction temperature rose to about 50° C. Upon equilibration of the mixture to room temperature, the mixture was stirred for 8 hours, after which it was allowed to stand overnight. The reactiton mixture was then poured into water and neutralized with ammonium hydroxide. The resulting mixture was extracted with three 150 ml. portions of chloroform. The combined chloroform extracts were dried, and solvent was removed to give 28.8 g. of a semi-crystalline residue containing some residual chloroform. Gas chromatographic analysis of this residue indicated it to be about 50 weight percent caprolactam, the remainder being cyclohexanone, cyclohexanone oxime, and residual chloroform.

Upon comparing Examples I and II, it is evident that extraction of the neutralized reaction mixture with chloroform, without prior extraction with ether, was unsatisfactory as a method for separating caprolactam and unreacted cyclohexanone oxime. The higher yield of caprolactam in Example II was apparently the result of the initial temperature rise to about 50° C. which did not occur in Example I.

Thus, in the preparation of caprolactam by the Beckmann rearrangement of cyclohexanone oxime, the unreacted oxime and the produced lactam were readily separated from each other and from the other components of the reaction mixture by extraction of the aqueous neutralized mixture with ether followed by extraction with chloroform.

I claim:
1. In a process for the production of a lactam by the Beckmann rearrangement of cycloalkanone oxime having 5 to 8 carbon atoms in which there is formed a reaction mixture containing said lactam and said cycloalkanone oxime the improvement which comprises:
  (a) diluting with water the reaction mixture;
  (b) neutralizing said mixture with a base;
  (c) adding a dialkyl ether having 4 to 6 carbon atoms to said mixture to form an ether phase and an aqueous phase, said ether phase containing the unreacted cycloalkanone oxime and said aqueous phase containing the lactam;
  (d) separating said ether phase and said aqueous phase;
  (e) extracting said lactam from said aqueous phase with a chlorinated aliphatic hydrocarbon selected from the group consisting of polychloroalkanes having 1–4 carbon atoms and polychloroalkenes having 2–4 carbon atoms; and
  (f) distilling said chlorinated aliphatic hydrocarbon containing said lactam to remove said chlorinated aliphatic hydrocarbon thus producing a high purity lactam.

2. A process according to claim 1 wherein said dialkyl ether is present in an amount at least three parts by weight of ether per part by weight of cycloalkanone oxime, said dialkyl ether preferably being present within the range of about 10 to 40 parts by weight of ether per part by weight of cycloalkanone oxime.

3. A process according to claim 1 wherein said chlorinated aliphatic hydrocarbon is present in an amount of at least 3 parts by weight of chlorinated aliphatic hydrocarbon per part by weight of lactam, and said chlorinated aliphatic hydrocarbon is preferably present within the range of about 10 to 150 parts by weight of chlorinated aliphatic hydrocarbon per part by weight of lactam.

4. A process according to claim 1 wherein said chlorinated aliphatic hydrocarbon is selected from the group consisting of chloroform, methylene chloride, carbon tetrachloride, 1,2-dichloroethane, 1,2-dichloropropane, 1,3-dichloropropane, 1,4-dichlorobutane, and 1,1,1,-trichloroethane.

5. A process according to claim 1 wherein said chlorinated aliphatic hydrocarbon is selected from the group consisting of trichloroethylene, tetrachloroethylene, 1,1-dichloroethylene, 1,2-dichloropropene, 1,2,3-trichloropropene, 1,3-dichloro-1-butene, and 1,4-dichloro-2-butene.

6. A process according to claim 1 which includes the step of drying said chlorinated aliphatic hydrocarbon containing said lactam prior to distillation of said chlorinated aliphatic hydrocarbon.

7. A process for the production of a lactam according to claim 1 which comprises:
  (a) dissolving cyclohexanone oxime in a 50–50 percent by volume mixture of acetic acid and anhydrous, liquid hydrogen fluoride;
  (b) stirring said mixture and allowing said mixture to stand until a portion of the cyclohexanone oxime is rearranged to caprolactam;
  (c) diluting said mixture with water to form a dilute solution;
  (d) neutralizing said diluted solution with concentrated ammonium hydroxide;
  (e) extracting said diluted mixture with three portions diethyl ether;
  (f) extracting said aqueous phase with three portions of chloroform, and combining the chloroform portions to form a single portion;
  (g) drying the combined chloroform extracts over magnesium sulfate to remove water; and
  (h) removing said chloroform by distillation to produce a product of substantially pure caprolactam.

8. A process according to claim 1 wherein said dialkyl-ether is diethylether and said cycloalkanone oxime is cyclohexanone oxime.

References Cited

UNITED STATES PATENTS

| | | | |
|---|---|---|---|
| 3,060,173 | 10/1962 | Von Schickh et al. | 260—239.3 |
| 3,156,723 | 11/1964 | Seifert | 260—566 |
| 2,313,026 | 3/1943 | Schlack | 260—239.3 |

OTHER REFERENCES

Baeyer "Ann. der Chemie," vol. 278, pp. 102–3 (1894).

HENRY R. JILES, Primary Examiner

R. T. BOND, Assistant Examiner

U.S. Cl. X.R.

260—294.7